(12) United States Patent
Ryan et al.

(10) Patent No.: US 10,891,979 B1
(45) Date of Patent: Jan. 12, 2021

(54) DATA STORAGE DEVICE CALIBRATING BIAS FOR FINE ACTUATORS

(71) Applicant: Western Digital Technologies, Inc., San Jose, CA (US)

(72) Inventors: Robert P. Ryan, Mission Viejo, CA (US); Shrey Khanna, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/851,510

(22) Filed: Apr. 17, 2020

(51) Int. Cl.
*G11B 5/54* (2006.01)
*G11B 5/55* (2006.01)
*G11B 5/596* (2006.01)
*G11B 5/592* (2006.01)

(52) U.S. Cl.
CPC ............ *G11B 5/556* (2013.01); *G11B 5/5534* (2013.01); *G11B 5/5565* (2013.01); *G11B 5/5578* (2013.01); *G11B 5/5926* (2013.01); *G11B 5/59627* (2013.01)

(58) Field of Classification Search
USPC ............ 360/78.05, 62, 70, 75, 77.02, 78.12
See application file for complete search history.

(56) References Cited

U.S. PATENT DOCUMENTS

| | | |
|---|---|---|
| 5,270,885 A | 12/1993 | Satoh et al. |
| 5,852,524 A | 12/1998 | Glover et al. |
| 6,172,944 B1 * | 1/2001 | Hatam-Tabrizi ............... G11B 11/10554 369/13.28 |
| 6,483,659 B1 | 11/2002 | Kobayashi et al. |
| 6,952,322 B1 | 10/2005 | Codilian et al. |
| 7,315,429 B2 | 1/2008 | van Zyl |
| 8,154,823 B2 * | 4/2012 | Saga ................... G11B 5/5552 360/78.05 |
| 8,705,198 B1 | 4/2014 | Hebbar et al. |
| 8,737,013 B2 | 5/2014 | Zhou et al. |
| 8,792,200 B1 | 7/2014 | Tam et al. |
| 8,976,483 B1 | 3/2015 | Kharisov |
| 9,099,134 B1 | 8/2015 | Pattanasinth et al. |
| 9,202,496 B2 | 12/2015 | Supino |
| 9,361,919 B1 | 6/2016 | Lieu et al. |
| 9,830,939 B1 | 11/2017 | Hamilton |
| 10,147,445 B1 | 12/2018 | Buch et al. |
| 2006/0066972 A1 | 3/2006 | Martin |
| 2012/0002314 A1 | 1/2012 | Huang et al. |

* cited by examiner

*Primary Examiner* — Nabil Z Hindi

(57) ABSTRACT

A data storage device is disclosed comprising a coarse actuator configured to actuate a first head over a first disk surface and a second head over a second disk surface. A first fine actuator is configured to actuate the first head over the first disk surface, and a second fine actuator is configured to actuate the second head over the second disk surface. A first bias signal is calibrated for the first fine actuator, and a second bias signal is calibrated for the second fine actuator. The first fine actuator is controlled based on the first bias signal and the second fine actuator is controlled based on the second bias signal in order to concurrently access the first disk surface and the second disk surface.

20 Claims, 13 Drawing Sheets

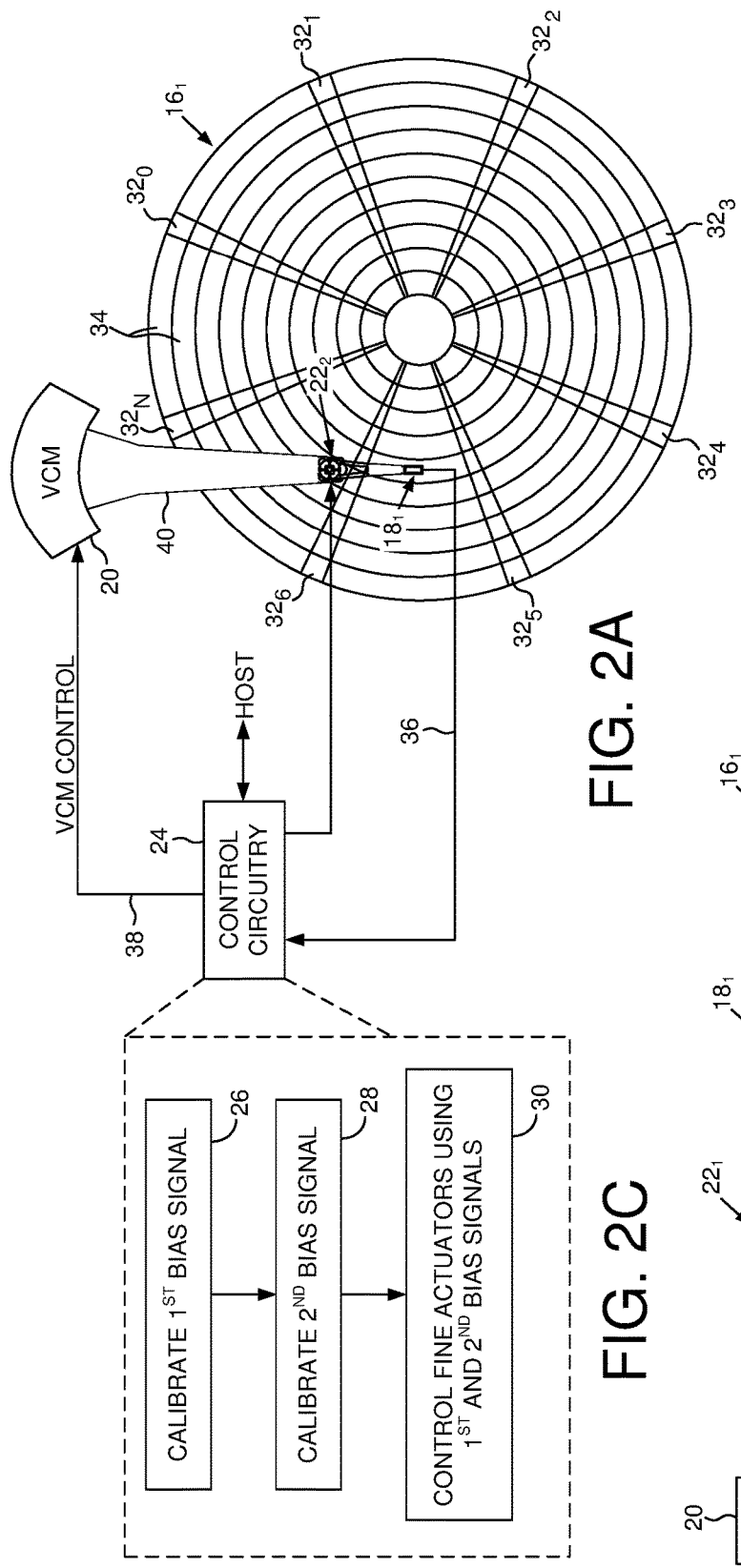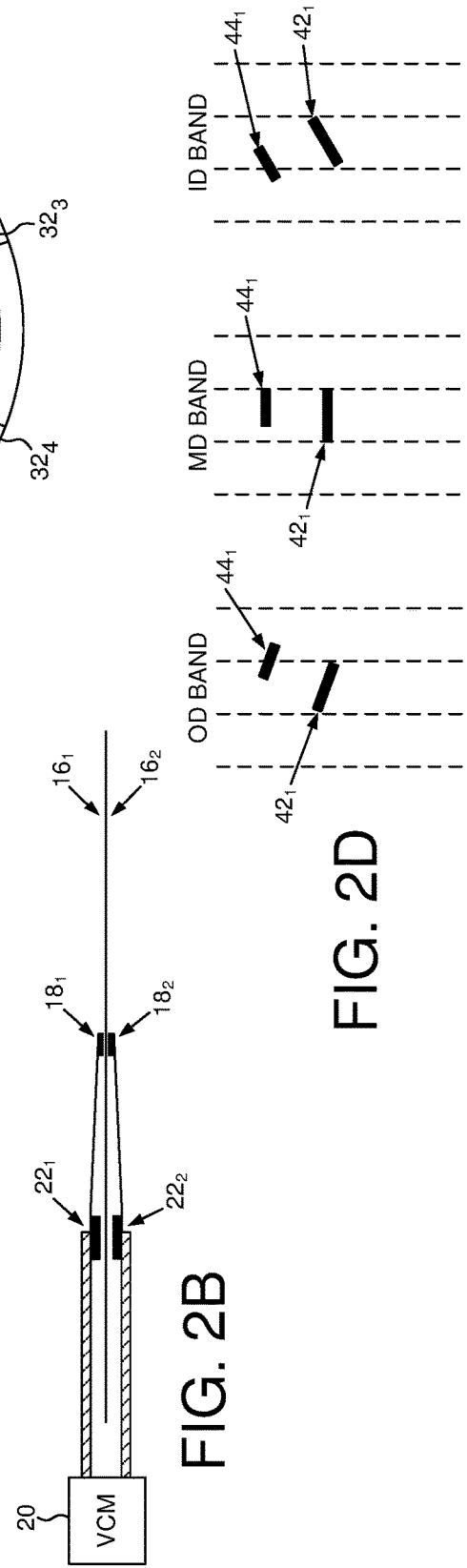

DATA STORAGE DEVICE CALIBRATING BIAS FOR FINE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIGS. 2A and 2B show a data storage device in the form of a disk drive comprising a first head actuated over a first disk surface using a first fine actuator and a second head actuated over a second disk surface using a second fine actuator.

FIG. 2C is a flow diagram according to an embodiment wherein a bias signal for each fine actuator is calibrated and used to servo the each head over their respective disk surface.

FIG. 2D shows an embodiment wherein each head comprises a read element radially offset from a write element.

DETAILED DESCRIPTION

Figure 1:
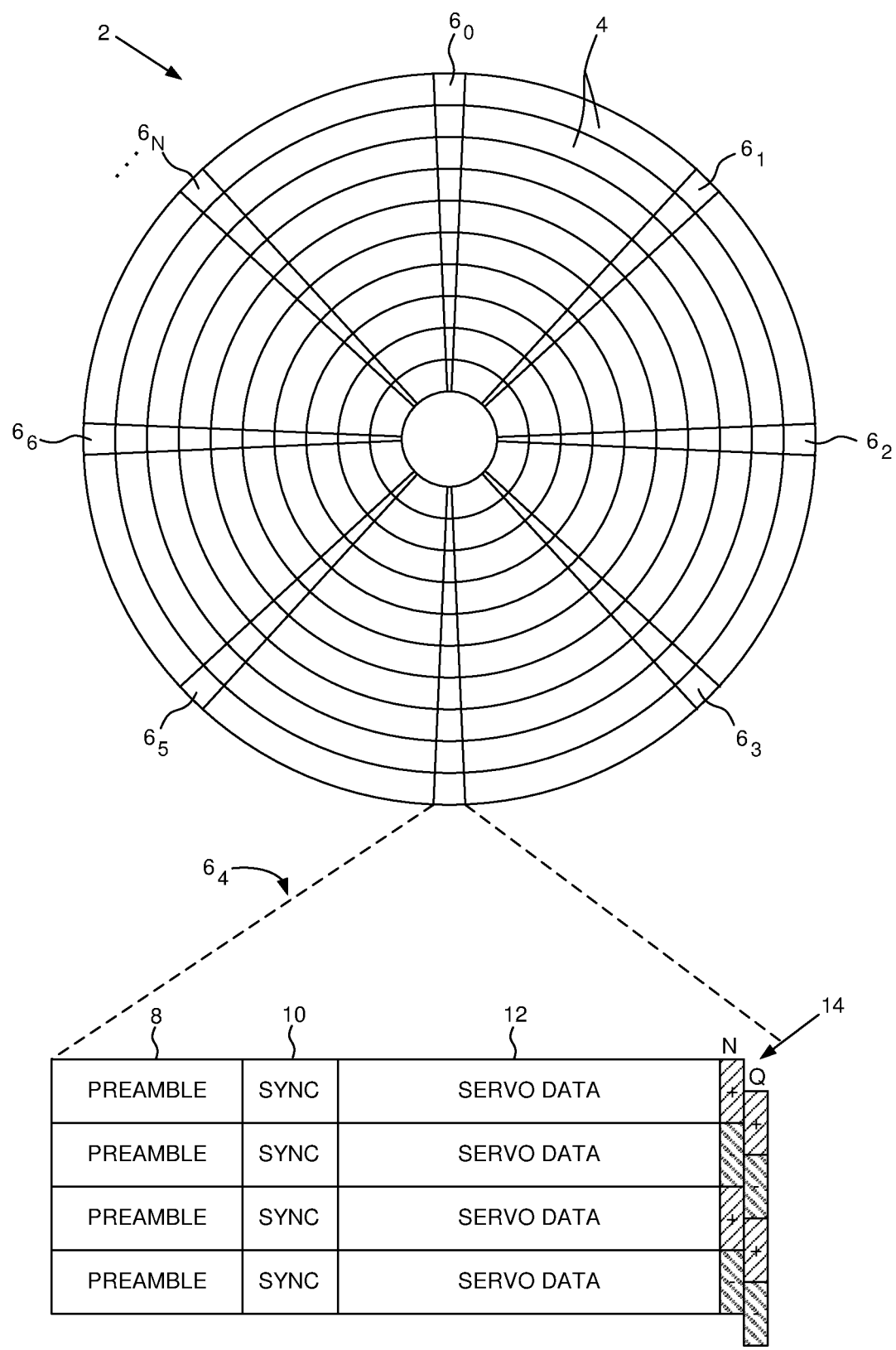
FIG. 1 shows a prior art disk format comprising a plurality of servo tracks defined by servo sectors.

FIGS. 2A and 2B show a data storage device in the form of a disk drive according to an embodiment comprising a first disk surface $16_1$, a first head $18_1$, a second disk surface $16_2$, a second head $18_2$, a coarse actuator 20 (e.g., a VCM) configured to actuate the first head $18_1$ over the first disk surface $16_1$ and the second head $18_2$ over the second disk surface $16_2$, a first fine actuator $22_1$ configured to actuate the first head $18_1$ over the first disk surface $16_1$, and a second fine actuator $22_2$ configured to actuate the second head $18_2$ over the second disk surface $16_2$. The disk drive further comprises control circuitry 24 configured to execute the flow diagram of FIG. 2C, wherein a first bias signal is calibrated for the first fine actuator (block 26), and a second bias signal is calibrated for the second fine actuator (block 28). The first fine actuator is controlled based on the first bias signal and the second fine actuator is controlled based on the second bias signal in order to concurrently access the first disk surface and the second disk surface (block 30).

In the embodiment of FIG. 2A, each disk surface comprises a plurality of servo sectors $32_0$-$32_N$ that define a plurality of servo tracks, wherein data tracks 34 are defined relative to the servo tracks at the same or different radial density. The control circuitry 24 processes a read signal 36 emanating from the head to demodulate the servo sectors and generate a position error signal (PES) representing an error between the actual position of the head and a target position relative to a target track. A servo control system in the control circuitry 24 filters the PES using a suitable compensation filter to generate a control signal 38 applied to the coarse actuator 20 (e.g., VCM) which rotates an actuator arm 40 about a pivot in order to actuate the head radially over the disk in a direction that reduces the PES. Each head is also be servoed using a fine actuator, such as a piezoelectric (PZT) actuator, configured to actuate a suspension relative to the actuator arm 40, and/or configured to actuate the head relative to the suspension. The servo sectors $32_0$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment shown in FIG. 2D, each head comprises a write element 42 and a read element 44 that may be radially offset due to fabrication tolerances. In addition, the radial offset between the write element 42 and read element 44 may vary based on the radial location of the head due to the skew angle of the head. That is, the skew angle of the head varies from the outer diameter (OD) of the disk to the middle diameter (MD) of the disk and from the MD to the inner diameter (ID) of the disk as shown in FIG. 2D. The radial offset between the write/read elements may range from a fraction of a servo track to one or more servo tracks. Accordingly in order to write data to a target data track, the read element 44 is servoed at a radial location (based on the servo sectors $32_0$-$32_N$) that positions the write element 42 over the target data track, thereby accounting for the radial offset between the write/read elements.

In one embodiment, the control circuitry 24 executes a concurrent access operation in order to concurrently access first and second disk surfaces, which in the embodiment of FIG. 2B, is the top and bottom surfaces of a disk. In this embodiment, the coarse actuator 20 servos both the top and bottom heads in coarse movements, while the fine actuators $22_1$ and $22_2$ servo the respective heads over the respective disk surfaces in fine movements. That is, in one embodiment the coarse actuator 20 compensates for low frequency deviations of the heads relative to the target data tracks, whereas the fine actuators $22_1$ and $22_2$ compensate for high frequency deviations. In one embodiment, there may be a radial offset between the top and bottom data tracks due, for example, to a radial offset between the write elements of the top and bottom heads. For example, in one embodiment the servo sectors may be bank servo written to the top and bottom disk surfaces, wherein a radial offset between the write elements of the top and bottom heads manifests as a radial offset of the written servo tracks.

In addition, there may be a radial offset of the read elements between the top and bottom heads due to fabrication tolerances. Accordingly when executing a concurrent write operation or concurrent read operation to the top and bottom disk surfaces, the radial offset between the read elements means the read elements will be tracking at a corresponding DC offset relative to a neutral position of the coarse actuator. Similarly, when the control circuitry is writing data to the top disk surface and concurrently reading data from the bottom disk surface, there is a radial offset between the read elements of the top and bottom heads due to the radial offset between the write/read elements as described above with reference to FIG. 2D. That is, the read element of the top head is offset from the target data track so as to position the write element over the target data track, whereas the read element of the bottom head is positioned over the target data track. Again this radial offset leads to each of the fine actuators tracking at a corresponding DC offset relative to a neutral position of the coarse actuator.

Figure 3A:
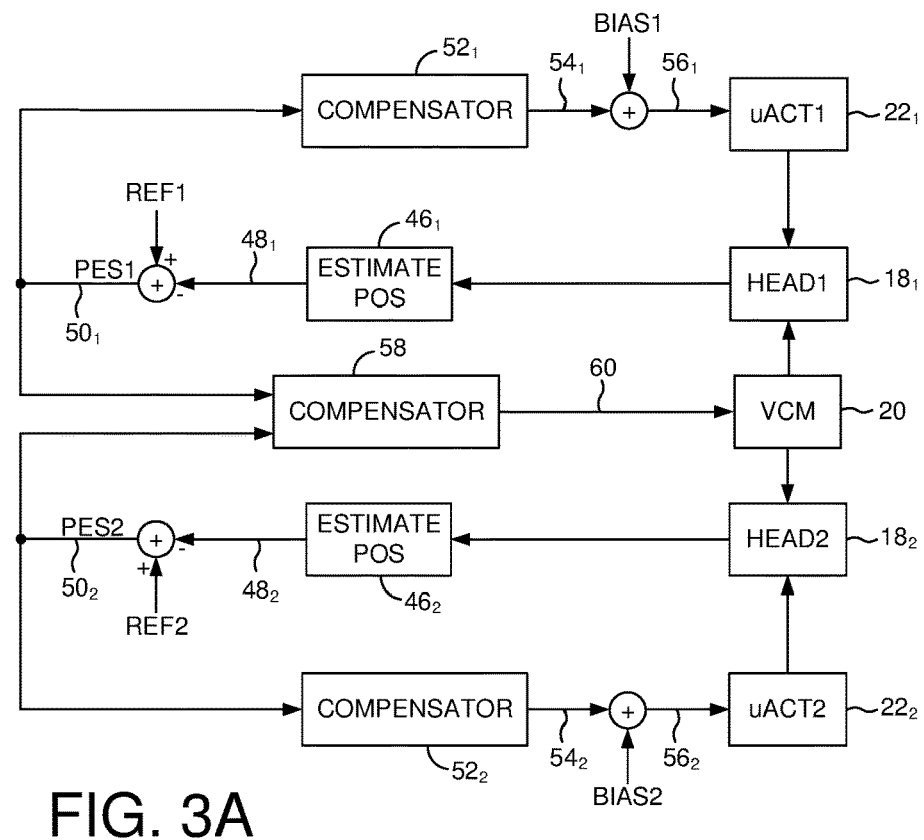
FIG. 3A shows a servo control system according to an embodiment wherein calibrated bias signals are applied to respective fine actuators.

FIG. 3A shows a servo control system according to an embodiment wherein the coarse actuator comprises a VCM 20 configured to rotate actuator arm(s) about a pivot in order to actuate the heads $18_1$ and $18_2$ in coarse movements, whereas the fine actuators $22_1$ and $22_2$ are configured to actuate the heads in fine movements relative to a neutral position of the VCM 20 while tracking the centerline of respective data tracks. A first position estimator $46_1$ processes the read signal from the first head $18_1$ while reading the servo sectors to generate a first position signal $48_1$, and a second position estimator $46_2$ processes the read signal from the second head $18_2$ while reading the servo sectors to generate a second position signal $48_2$. The position signals are subtracted from respective references REF1 and REF2 to generate respective position error signals (PES) $50_1$ and $50_2$. A first fine actuator compensator $52_1$ processes the first PES $50_1$ to generate a first compensated signal $54_1$, and a second fine actuator compensator $52_2$ processes the second PES $50_2$ to generate a second compensated signal $54_2$. A first bias signal BIAS1 is added to the first compensated signal $54_1$ to generate a first control signal $56_1$ applied to the first fine actuator $22_1$. A second bias signal BIAS2 is added to the second compensated signal $54_2$ to generate a second control signal $56_2$ applied to the second fine actuator $22_2$. In one embodiment, the bias signals BIAS1 and BIAS2 are configured so that the respective heads achieve a target radial offset relative to the neutral position of the VCM 20, wherein the target radial offset corresponds to the radial offset between the heads during concurrent access operations as described above. The control signals $56_1$ and $56_2$ then operate to servo each head in fine movements relative to the DC offset established by the bias signals. One or both of the PES $50_1$ and/or $50_2$ are processed by a VCM compensator 58 to generate a VCM control signal 60 applied to the VCM 20 in order to servo the heads $18_1$ and $18_2$ in coarse movements, such as when seeking the heads to target data tracks or during tracking operations.

Figure 3B:
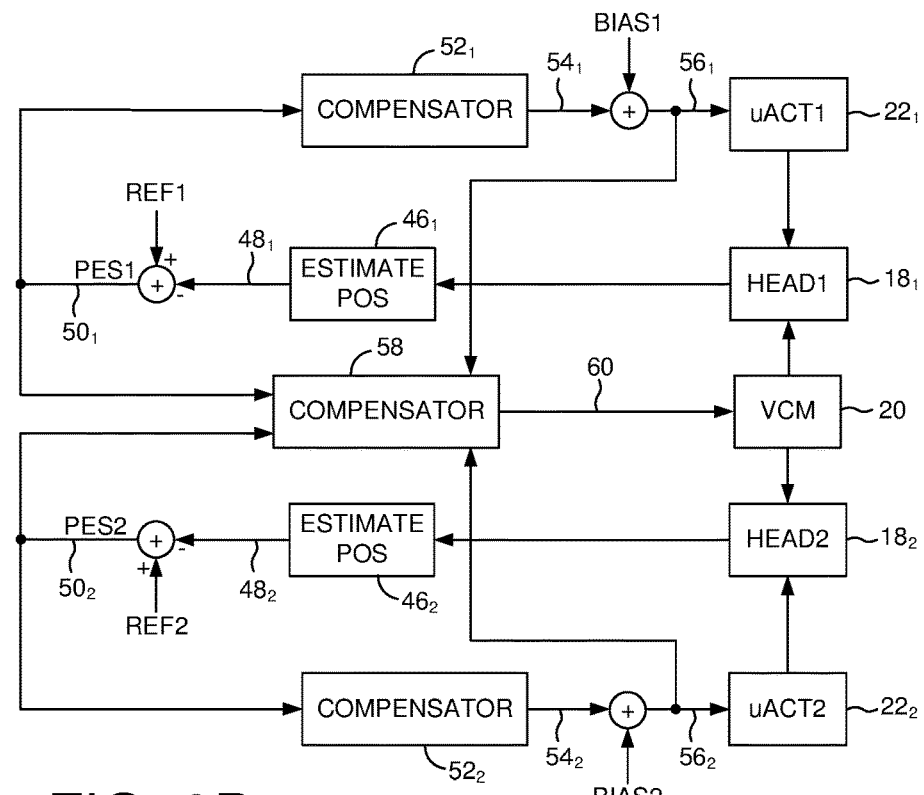
FIG. 3B shows a servo control system according to an embodiment wherein the fine actuator control signals are balanced by a coarse actuator compensator to achieve a target ratio.

FIG. 3B shows a servo control system according to an embodiment wherein the fine actuator control signals $56_1$ and $56_2$ are processed by the VCM compensator 58 in order to control the VCM 20 so as to achieve a target ratio for the control signals $56_1$ and $56_2$ on average. For example, in an embodiment where the two fine actuators $22_1$ and $22_2$ have substantially the same performance in terms of gain and stroke, the target ratio for the control signals $56_1$ and $56_2$ may be 50/50 so that the VCM 20 remains at a middle position between the two fine actuator movements on average, thereby ensuring both fine actuators operate with a substantially equal stroke capability while concurrently servoing the heads in fine movements. In an embodiment described below, the servo control system of FIG. 3B may also be used to calibrate the bias signals for the fine actuators during a calibration procedure.

Figure 4A:
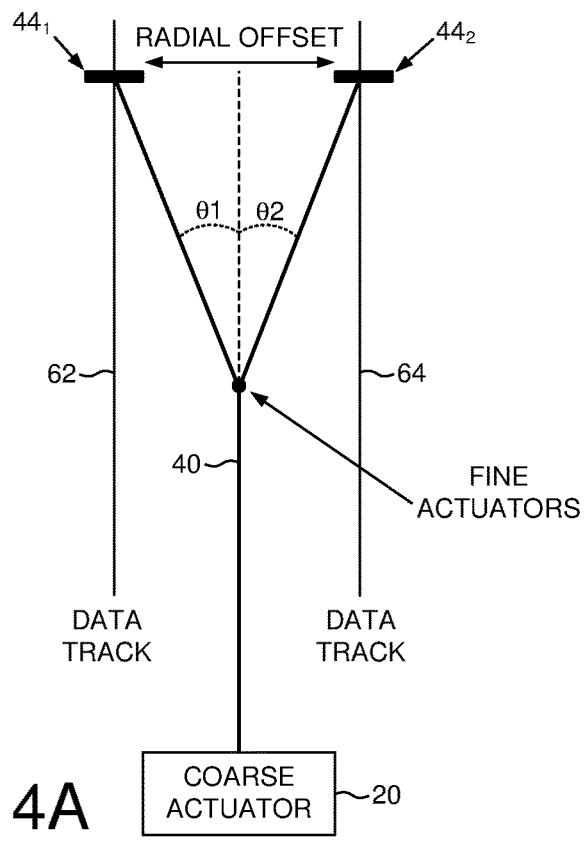
FIG. 4A shows an embodiment wherein each bias signal causes a corresponding radial displacement of the fine actuators in order to compensate for a radial offset of first and second heads.

FIG. 4A shows an example embodiment wherein the read element $44_1$ of the first head $18_1$ is servoed over a first data track 62 of the first disk surface $16_1$, and the read element $44_2$ of the second head $18_2$ is servoed over a second data track 64 of the second disk surface $16_2$ (e.g., top and bottom disk surfaces of the same disk). In one embodiment, the radial offset between the first data track 62 and the second data track 64 may be a fraction of a data track width, and in another embodiment the radial offset may be several data tracks (as measured from either disk surface). As described above, there is a radial offset between the read elements $44_1$ and $44_2$ when positioned over their respective data tracks due to fabrication tolerances, servo writing anomalies, writer/reader offset when writing to one data track and reading from the other, etc. In this embodiment, the bias signal applied to each fine actuator is substantially equal such that the angular displacement of each fine actuator relative to the actuator arm 40 is substantially equal as shown in FIG. 4A. That is in this example, the bias signal applied to each fine actuator causes a radial offset that is substantially equal to half of the full radial offset between the read elements $44_1$ and $44_2$. As a result, the neutral or DC position of the coarse actuator 20 corresponds to the actuator arm 40 being positioned at the middle point between the read elements $44_1$ and $44_2$.

Figure 4B:
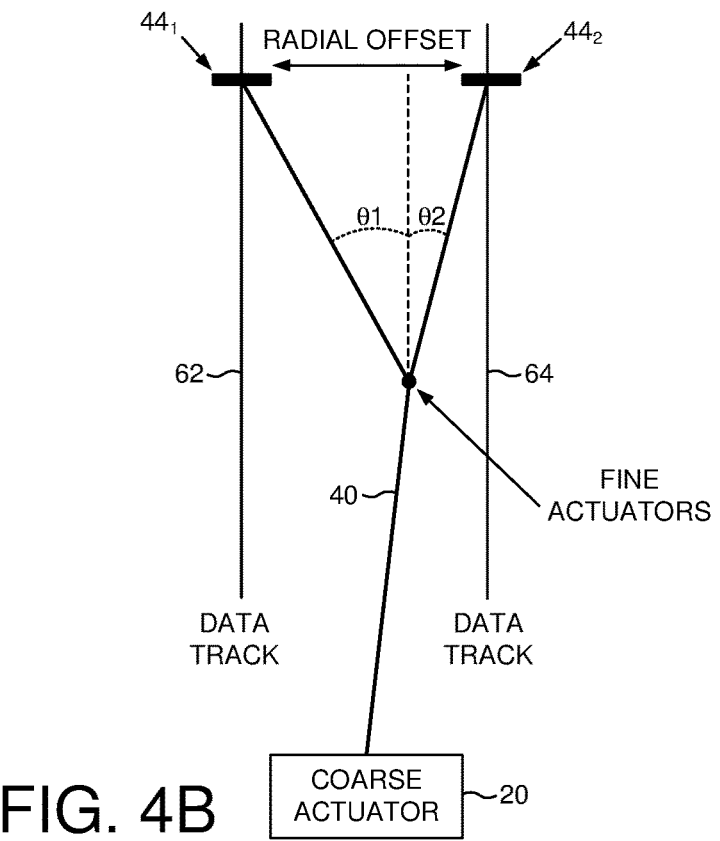
FIG. 4B shows an embodiment wherein the bias signal for the first head is greater than the bias signal for the second head to compensate for a stroke of the first fine actuator being greater than a stroke of the second fine actuator.

In an embodiment shown in FIG. 4B, the ratio of the radial offsets between each read element $44_1$ and $44_2$ may be different than fifty percent to compensate for different strokes between the first and second fine actuators. That is, the stroke of each fine actuator may be measured, and then the ratio of the radial offsets configured based on the measured strokes. In the example of FIG. 4B, the stroke of the first fine actuator for actuating the first read element $44_1$ is larger than the stroke of the second fine actuator for actuating the second read element $44_2$. Accordingly in this embodiment, the bias signals for the fine actuators are configured such that the radial offset of the second read element $44_2$ relative to the actuator arm 40 is less than the radial offset of the first read element $44_1$ (i.e., the first bias signal is configured to be greater than the second bias signal). In this manner, both the first and second fine actuators are able to track the high frequency deviations of the read elements relative the target data tracks during a concurrent access operation.

Any suitable technique may be employed to calibrate the bias signals applied to the fine actuators, such as the bias signals BIAS1 and BIAS2 in the servo control system of FIG. 3A. In one embodiment, the servo control system of FIG. 3B may be used to calibrate the bias signals during a calibration procedure, such as during a manufacturing procedure. In this embodiment, the bias signals BIAS1 and BIAS2 are zeroed so that there is initially no bias offset applied to the fine actuators. The reference signals REF1 and REF2 are configured to correspond to target radial locations of each disk surface, such as target data tracks of each disk surface. The servo control system then controls the fine actuators $22_1$ and $22_2$ to move the read elements of the heads toward their respective target radial locations, while the VCM compensator 58 controls the VCM 20 so as to balance the fine actuator control signals $56_1$ and $56_1$ based on a target ratio (e.g., 50/50). Eventually the DC component of each fine actuator control signal $56_1$ and $56_2$ will converge to a value that corresponds to a radial offset between the read elements such as shown in FIG. 4A. After the DC component of each fine actuator control signal $56_1$ and $56_1$ converges, the DC components are saved as the bias signals BIAS1 and BIAS2 for use during normal access operations.

In one embodiment, the bias signals for the fine actuators may be calibrated at a number of different radial locations across the disk surfaces to account for the varying skew angle of the head, a varying data track density (TPI), a non-linear gain of the fine actuators, etc. In one embodiment, the plurality of calibrated bias signals may be curve fitted to any suitable function (e.g., a polynomial) which may be used to generate the bias signals at any given radial location. In yet another embodiment described in greater detail below, the bias signals for the fine actuators may be calibrated at different operating temperatures, and the bias signals configured during normal access operations based on a measured operating temperature.

Figure 5A:
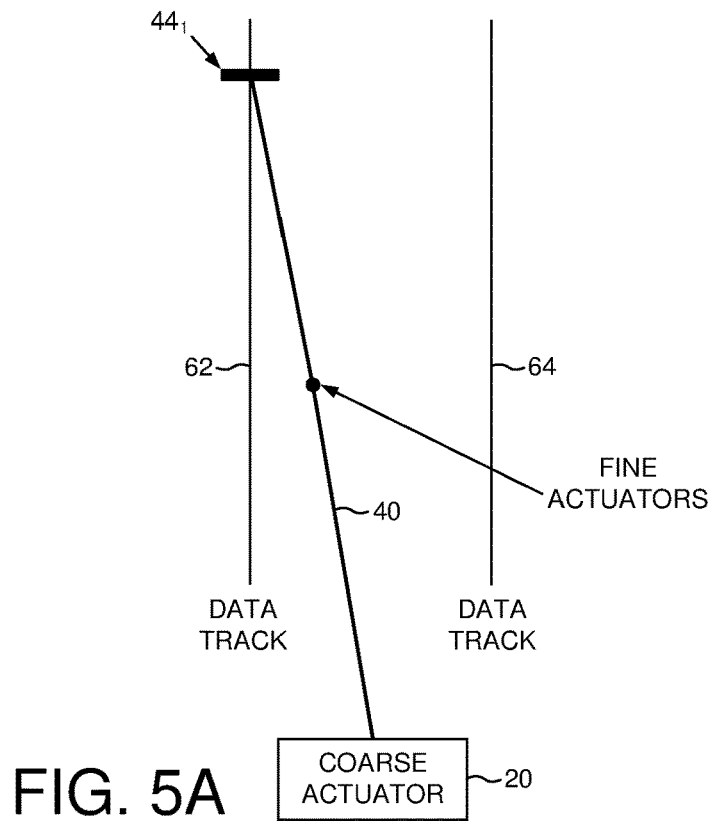
FIGS. 5A and 5B show an embodiment for calibrating the bias signals by reading tracks on the first and second disk surfaces.
Figure 5B:
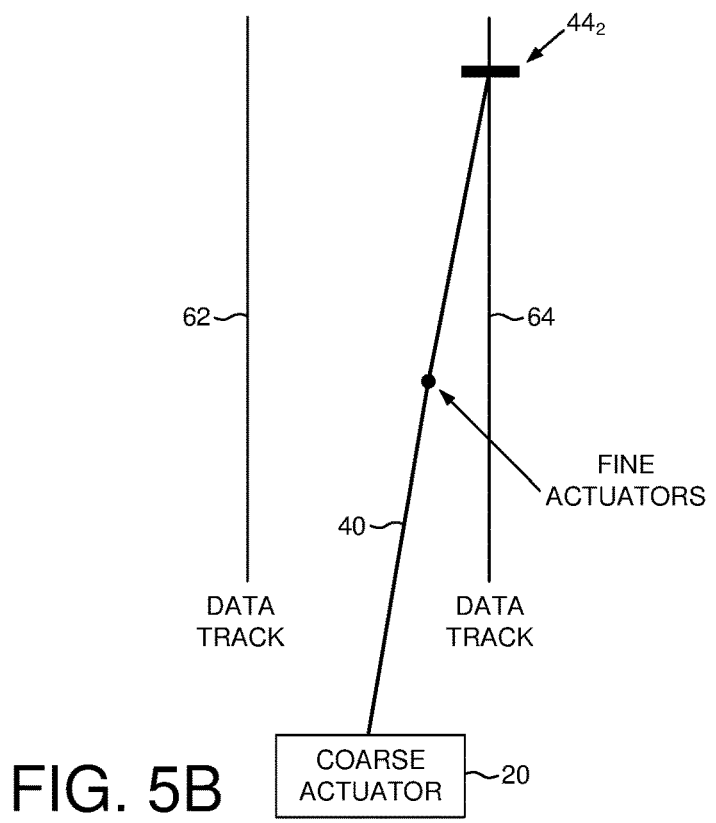

FIGS. 5A and 5B show another technique for calibrating the bias signals for the fine actuators. In this embodiment, the bias signals are zeroed so that there is initially no bias offset applied to the fine actuators. The coarse actuator 20 is then controlled to move the first read element $44_1$ of the first head (e.g., top head) to a target radial location, such as a first data track 62 of the first disk surface. After the first read element $44_1$ has settled on the target, the position of the second read element $44_2$ of the second head (e.g., bottom head) is measured by reading the servo sectors on the second disk surface. The coarse actuator 20 is then controlled to position the second read element $44_2$ of the second head (e.g., bottom head) to a target radial location, such as a second data track 64 of the second disk surface. After the second read element $44_2$ has settled on the target, the position of the first read element $44_1$ of the first head (e.g., top head) is measured by reading the servo sectors on the first disk surface. In this manner the radial offset between the read elements such as shown in FIG. 4A may be measured as the difference between the measured positions of the read elements. In one embodiment, this measured radial offset may then be converted into corresponding bias signals that will achieve the biased radial offset for each fine actuator such as shown in FIG. 4A or FIG. 4B.

In one embodiment, the bias signals that are generated based on the measured radial offset may be used as initial values to execute normal access operations such as with the servo control system of FIG. 3B. That is, the initial values of the bias signals may provide a relatively good estimate of the optimal values, thereby decreasing the settle time of the heads after a seek operation. In one embodiment, the initial values of the bias signals may be updated based on the DC component of the control signals $56_1$ and $56_2$ (e.g., by adding the DC component to the bias signal). The updated bias signals may be stored in a non-volatile memory (e.g., in a table indexed by radial location) and used for subsequent access operations.

Figure 6:
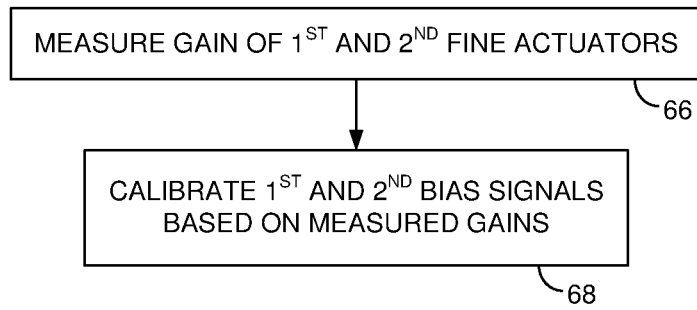
FIG. 6 is a flow diagram according to an embodiment wherein the bias signals are calibrated based on a measured gain of each fine actuator.

FIG. 6 is a flow diagram according to an embodiment wherein a gain of the fine actuators $22_1$ and $22_2$ is measured (block 66), and the fine actuator bias signals are calibrated based on the measured gains (block 68). The measured gains may be used for any suitable reason, such as to generate a function representing the radial displacement of each head relative to the control signal 56 applied to the fine actuator. This function may then be used to compute the bias signals based on the measured radial offset between the read elements as described above. In another embodiment, the measured gains of the fine actuators may be used to configure the ratio of the fine actuator control signals $56_1$ and $56_2$ for the servo control system of FIG. 3B. For example, in one embodiment the ratio of the control signals $56_1$ and $56_2$ may be configured to substantially match the ratio of the gains in order to compensate for the difference between the gains. In another embodiment, the fine actuator control signals $56_1$ and $56_2$ may be scaled based on the ratio of the measured gains in order to compensate for the difference between the gains.

Figure 7:
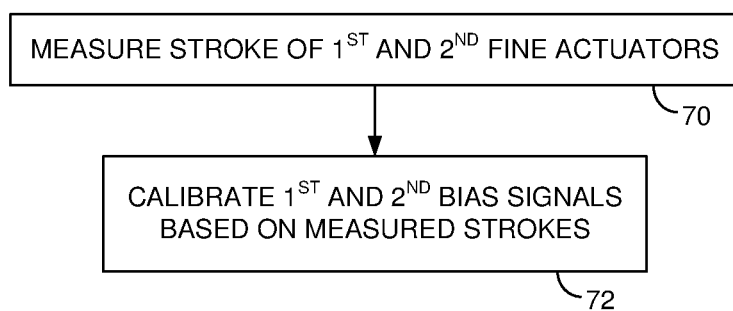
FIG. 7 is a flow diagram according to an embodiment wherein the bias signals are calibrated based on a measured stroke of each fine actuator.

FIG. 7 is a flow diagram according to an embodiment wherein a stroke of the fine actuators $22_1$ and $22_2$ is measured (block 70), and the fine actuator bias signals are calibrated based on the measured strokes (block 72). The measured strokes may be used for any suitable reason, such as to configure the radial offset of each read element $44_1$ and $44_2$ as described above with reference to the example of FIG. 4B. In this embodiment, the fine actuator with the larger stroke is displaced with a larger radial offset relative to the actuator arm 40, thereby maximizing the combined stroke of both fine actuators relative to the actuator arm 40 during access operations.

Figure 8:
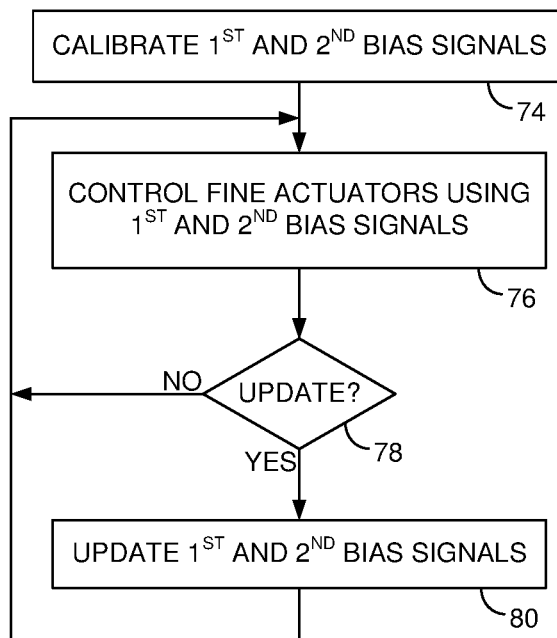
FIG. 8 is a flow diagram according to an embodiment wherein the bias signals are updated to compensate for variations in operating conditions, such as temperature.

FIG. 8 is a flow diagram according to an embodiment wherein after calibrating the fine actuator control signals (block 74), the fine actuators $22_1$ and $22_2$ are controlled during access operations, such as with the servo control system of FIG. 3B. In one embodiment, as part of executing a seek operation the fine actuator bias signals are adjusted to correspond to the target radial location at the end of the seek. In one embodiment, the adjustments to the bias signals may be made gradually during the seek to avoid injecting a transient into the servo control system. In this manner when the read elements $44_1$ and $44_2$ reach the target data tracks at the end of the seek, the settle time of the seek is reduced since the bias signals will be at or near their optimal values. In one embodiment, variations in the operating conditions of the data storage device may affect the optimal values for the fine actuator bias signals. For example, variations in environmental conditions such as the operating temperature may cause a thermal expansion of the disk surfaces and/or of the actuating elements, thereby changing the radial offset between the read elements described above with reference to FIG. 4A. In other embodiments, the performance of one or both of the fine actuators $22_1$ and $22_2$ may degrade over time which may also affect the radial offset between the read elements. Accordingly in the embodiment of FIG. 8, when an update of the fine actuator bias signals is triggered (block 78), the fine actuator bias signals are updated in any suitable manner. For example, in one embodiment the DC component of the fine actuator control signals $56_1$ and $56_2$ may be used to update the fine actuator bias signals as described above. In another embodiment, the bias signals may be updated by measuring the radial offset between the read elements at different radial locations as described above with reference to FIGS. 5A and 5B. The update may be triggered by a periodic interval, when a change in operating conditions is detected (e.g., a change in temperature), when a physical vibration affecting the disk drive is detected, when the average settle time of seeks exceeds a threshold, etc.

Figure 9:
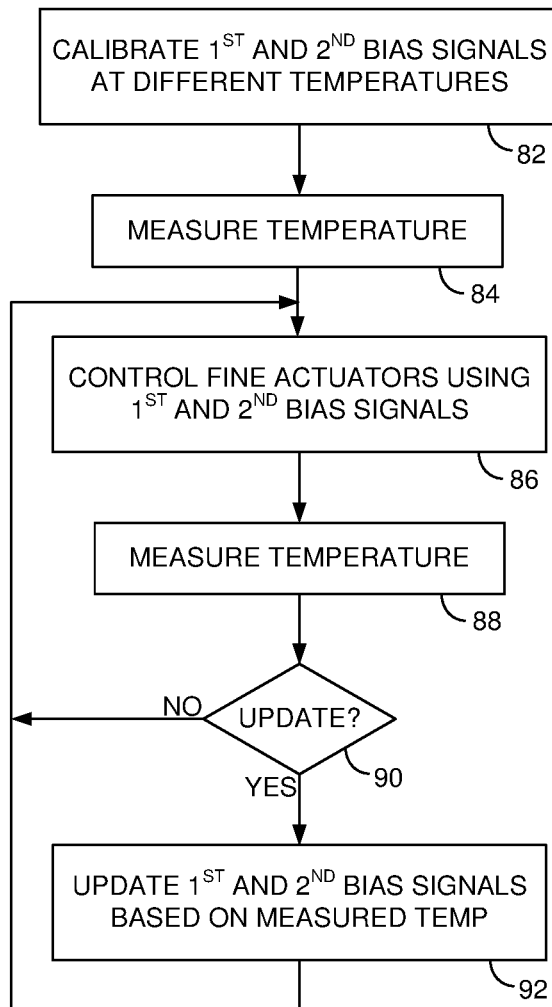
FIG. 9 is a flow diagram according to an embodiment wherein the bias signals are calibrated for different temperatures, and during normal operation the bias signals are updated based on a measured operating temperature.

FIG. 9 is a flow diagram according to an embodiment wherein the fine actuator bias signals may be calibrated at different operating temperatures for multiple radial locations (block 82), for example, during a manufacturing procedure. During normal operation, the operating temperature is measured (block 84) and the fine actuators are controlled based on the bias signals corresponding to the measured temperature (block 86). The operating temperature may be remeasured (block 88), for example prior to each seek operation, and when a delta in the operating temperature exceeds a threshold (block 90), the fine actuator bias signals may be updated corresponding to the measured temperature (block 92). Similar to the flow diagram of FIG. 8, this embodiment may compensate for a thermal expansion of the disk surfaces and/or of the actuating elements which may change the radial offset between the read elements described above with reference to FIG. 4A. However, this embodiment may enable faster adaptation of the fine actuator bias signals to a change in operating temperature as compared to reacting to a measured degradation in servo performance. In addition, this embodiment may better optimize the initial set of values for the fine actuator bias signals when the data storage device is first powered on, as compared to initializing the bias signals with a single set of values that are adapted over time to match the operating temperature at power on.

Figure 10:
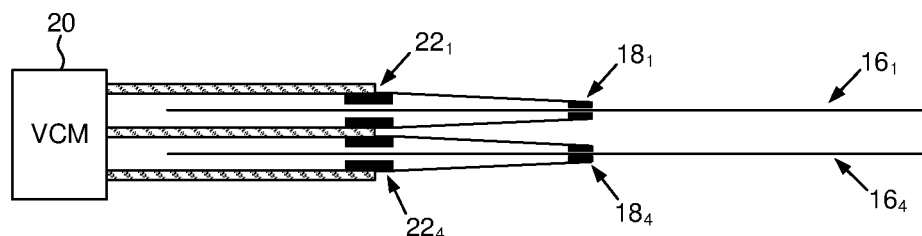
FIG. 10 shows an embodiment wherein the disk drive comprises multiple disks having top and bottom heads actuated over top and bottom disk surfaces.

In one embodiment such as shown in FIG. 10, the data storage device may comprise multiple disks with at least one head actuated over corresponding top and bottom disk surfaces $16_1$-$16_4$, wherein the control circuitry 24 may execute a concurrent access operation to two or more disk surfaces. In one embodiment, the control circuitry 24 may execute a concurrent access operation of top and bottom disk surfaces of the same disk, and in another embodiment the control circuitry 24 may execute a concurrent access operation of disk surfaces from different disks. In one embodiment, the servo sectors of at least two disk surfaces (e.g., top and bottom surfaces) may be bank servo written in order to improve the coherency of the servo sectors and servo tracks across the disk surfaces. In yet another embodiment, the fine actuator bias signals may be adjusted based on which disk surfaces are being concurrently accessed, that is, based on the radial offset of the corresponding read elements.

Figure 11A:
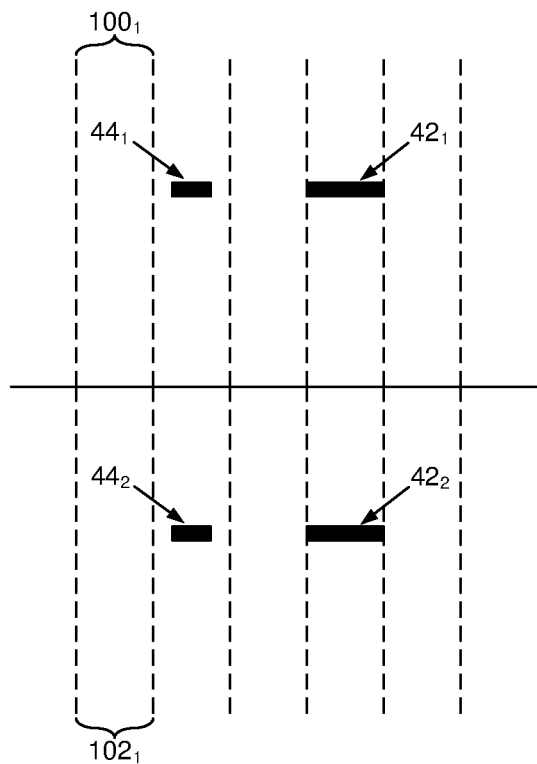
FIGS. 11A-11D show embodiments wherein the write/read elements may have different radial offset relative to each head.
Figure 14:
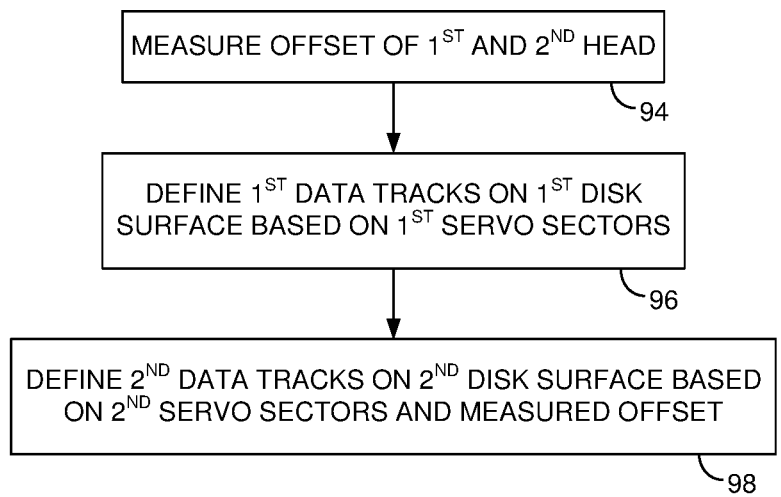
FIG. 14 is a flow diagram according to an embodiment wherein data tracks on the second disk surface are defined based on the servo sectors and the measured offset of the first and second head.

FIG. 14 is a flow diagram according to an embodiment wherein an offset of the first and second head is measured (block 94), first data tracks are defined on a first disk surface based on the servo sectors of the first disk surface (block 96), and second data tracks are defined on a second disk surface based on the servo sectors of the second disk surface and on the measured offset (block 98). FIG. 11A shows an embodiment wherein a top head comprises a first write element $42_1$ and a first read element $44_1$, and a bottom head comprises a second write element $42_2$ and a second read element $44_2$. In one embodiment, the servo sectors are bank written to the top and bottom disk surfaces to define servo tracks, such as servo track $100_1$ on the top disk surface and servo track $102_1$ on the bottom disk surface. Also in the example of FIG. 11A, the data tracks are defined at the same radial density as the servo tracks.

Figure 11B:
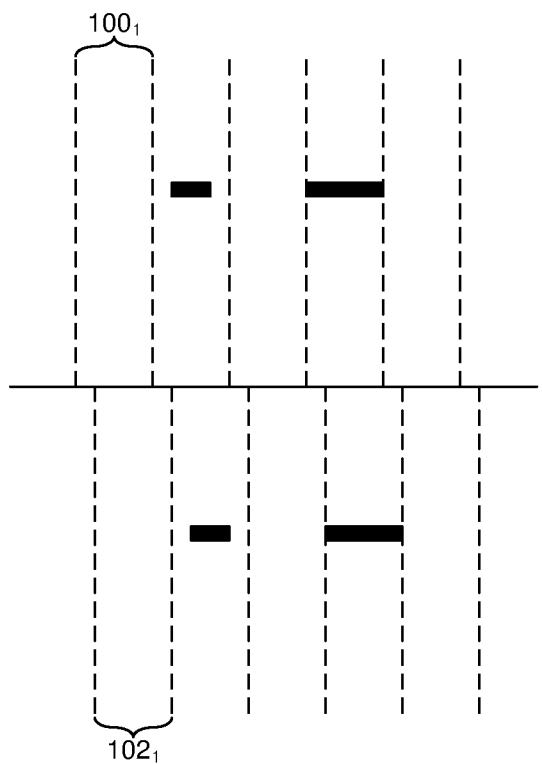
Figure 11C:
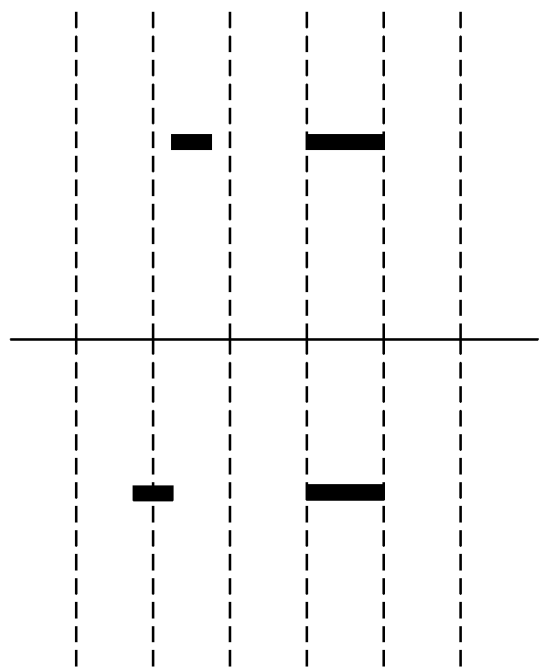
Figure 11D:
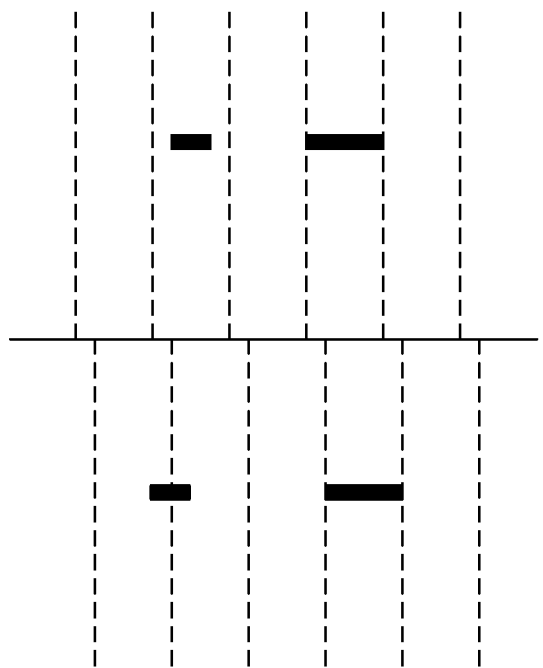

In some embodiments, the radial offset between the write element and the read element may be different between the top and bottom heads. In addition, the write/read elements of the top head may be radially offset from the write/read elements of the bottom head. In the embodiment of FIG. 11A, the radial offset between the write/read elements is the same for the top and bottom heads, and the write/read elements of the top head are aligned radially with the write/read elements of the bottom head. In the embodiment of FIG. 11B, the radial offset between the write/read elements is the same for the top and bottom heads, but the write/read elements of the top head are radially offset from the write/read elements of the bottom head. Accordingly there is a radial offset between the bank written servo tracks of the top and bottom disk surfaces, such as servo track $100_1$ on the top disk surface and servo track $102_1$ on the bottom disk surface. FIG. 11C shows an embodiment wherein the write element $42_1$ of the top head is aligned radially with the write element $42_2$ of the bottom head resulting in radially aligned servo tracks, but the read element $44_1$ of the top head is radially offset from the read element $44_2$ of the bottom head. FIG. 11D shows an embodiment wherein the radial offset between the write/read elements differs between the top and bottom heads, as well as both the write/read elements of the top head being radially offset from the write/read elements of the bottom head.

Figure 12A:
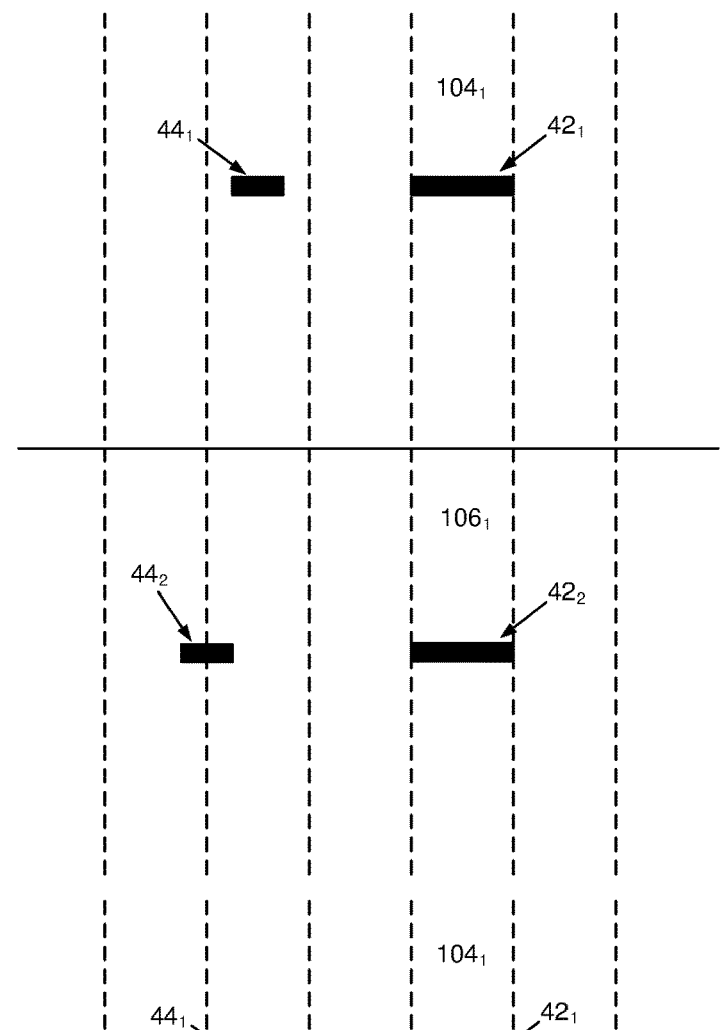
FIGS. 12A and 12B show an embodiment wherein data tracks on the second disk surface are defined with a radial offset relative to the data tracks on the first disk surface to account for a radial offset of the first and second head.
Figure 12B:
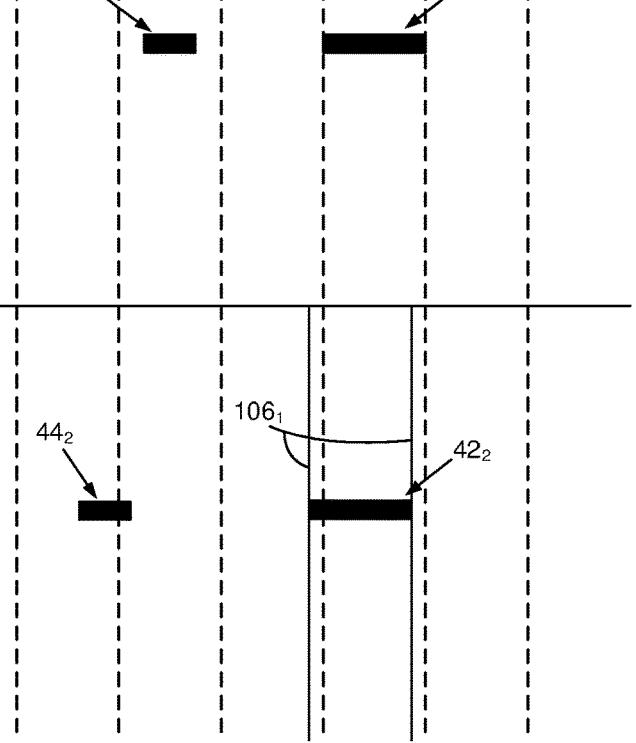

In the embodiments of FIG. 11A and FIG. 11B, the data tracks of the top and bottom disk surfaces are defined radially aligned with the servo tracks since the neutral position of the fine actuators are zero (zero bias signals) when concurrently writing or reading the data tracks. However in the embodiment of FIG. 11C (also shown magnified in FIG. 12A), if the data tracks are radially aligned with the servo tracks then when concurrently reading data tracks from the top and bottom disk surfaces (e.g., when concurrently reading data track $104_1$ and $106_1$), the bias signals of the fine actuators are non-zero so that read element $44_1$ remains centered over data track $104_1$ and read element $44_2$ remains centered over data track $106_1$ (that is, to compensate for the radial offset between read element $44_1$ and read element $44_2$). When concurrently writing top data track $104_1$ and bottom data track $106_1$, the bias signals of the fine actuators are zero since the write element $42_1$ of the top head is radially aligned with the write element $42_2$ of the bottom head. In one embodiment shown in FIG. 12B, the data tracks on the bottom disk surface are defined based on the servo sectors on the bottom disk surface as well as the radial offset between the read element $44_1$ of the top head and the read element $44_2$ of the bottom head. For example, in one embodiment data track $106_1$ is defined relative to the servo sectors on the bottom disk surface so as to be radially offset from the data track $104_1$ on the top disk surface, wherein the radial offset of the data tracks is half the radial offset between the top and bottom read elements. In this manner, the bias signals of the fine actuators when concurrently writing or reading the top and bottom data tracks are non-zero, but smaller than the non-zero bias signals when concurrently reading the top and bottom data tracks when the data tracks are aligned to the servo tracks such as in FIG. 12A. Spreading the bias signals across the write and read operations to compensate for the radial offset between the read elements of the top and bottom heads optimizes the stroke of the fine actuators by minimizing the biased offset of the fine actuators for both write/read operations (as compared to having a larger bias offset for read operations and zero bias offset for write operations).

Figure 13A:
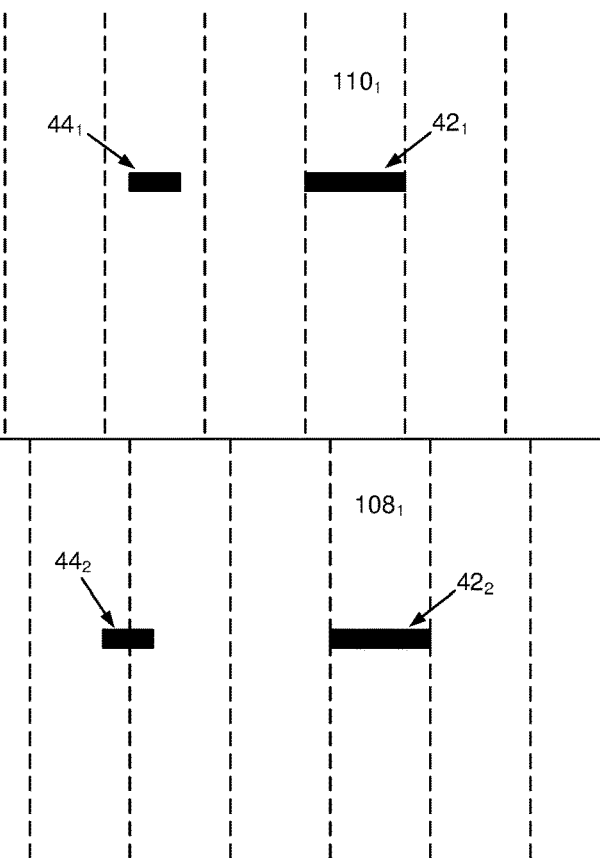
FIGS. 13A and 13B show another embodiment wherein data tracks on the second disk surface are defined with a radial offset relative to the data tracks on the first disk surface to account for a radial offset of the first and second head.
Figure 13B:
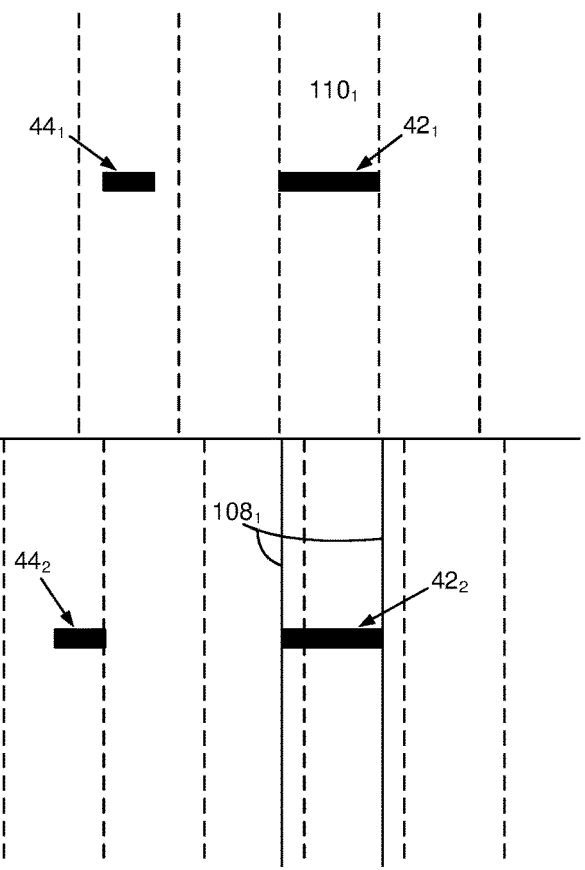

FIG. 13A shows a magnified view of FIG. 11D wherein the write/read element offset of the top head is different than the write/read element offset of the bottom head, as well as there being a radial offset of both the write/read elements between the top and bottom heads. If the data tracks of the top and bottom disk surfaces are aligned with the servo tracks as shown in FIG. 13A, the difference between write/read element offsets means the bias signals applied to the fine actuators is non-zero during a read operation (and zero during a write operation since the write elements are aligned with the servo tracks). In order to reduce the amplitude of the bias signals during a read operation, in one embodiment the data tracks of the bottom disk surface are defined based on the servo sectors on the bottom disk surface as well as the difference between the write/read element offsets. For example, in one embodiment data track $108_1$ is defined relative to the servo sectors on the bottom disk surface so as to be radially offset from the data track $110_1$ on the top disk surface, wherein the radial offset of the data tracks is half of the difference between the write/read element offset of the top and bottom heads. In this manner, the bias signals of the fine actuators when concurrently writing or reading the top and bottom data tracks are non-zero, but smaller than the non-zero bias signals when concurrently reading the top and bottom data tracks when the data tracks are aligned to the servo tracks such as in FIG. 13A.

In one embodiment, the radial offsets of the heads described above may be negligible and therefore do not need compensation by adjusting the relative alignment of the data tracks between the top and bottom disk surfaces. However in another embodiment, the radial offsets of the heads described above may be so large that it may prevent the concurrent servoing of the top and bottom heads during a concurrent access operation of corresponding top and bottom data tracks. That is, the radial offsets of the read elements may exceed the stroke capability of the fine actuators so that it may not be possible to concurrently servo the top and bottom read elements over corresponding top and bottom data tracks. In yet another embodiment, the radial offsets of the heads as described above may increase with increasing operating temperature due to thermal expansion of the disk surfaces and/or the actuating elements. If the radial offset of the read elements increases beyond the stroke capability of the fine actuators, it may prevent the concurrent access of corresponding top and bottom data tracks. Accordingly in one embodiment in order to compensate for an excessive radial offset between the read elements of top and bottom heads, a concurrent access operation may be executed in two phases. During a first phase, only one of the top or bottom heads accesses the top or bottom disk surface during a single access interval by writing/reading one or more data tracks. When the read element of the other head "catches up" to the access operation, then during a second phase both the top and bottom heads access the top and bottom disk surfaces during a dual access interval.

Figure 15:
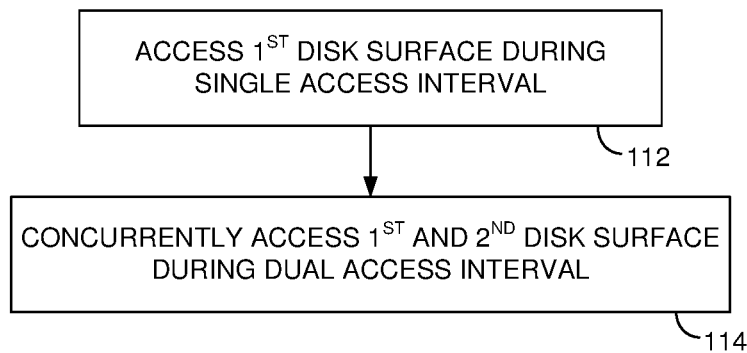
FIG. 15 is a flow diagram according to an embodiment wherein the first disk surface is accessed during a single access interval, and then the first and second disk surfaces are concurrently accessed during a dual access interval.

This embodiment may be understood with reference to the flow diagram of FIG. 15, wherein to execute a concurrent access operation of multiple consecutive data tracks (on top and bottom disk surfaces), a first disk surface is first accessed without accessing the second disk surface during a single access interval (block 112). After the single access interval, the first and second disk surface are concurrently accessed during a dual access interval (block 114).

Figure 16A:
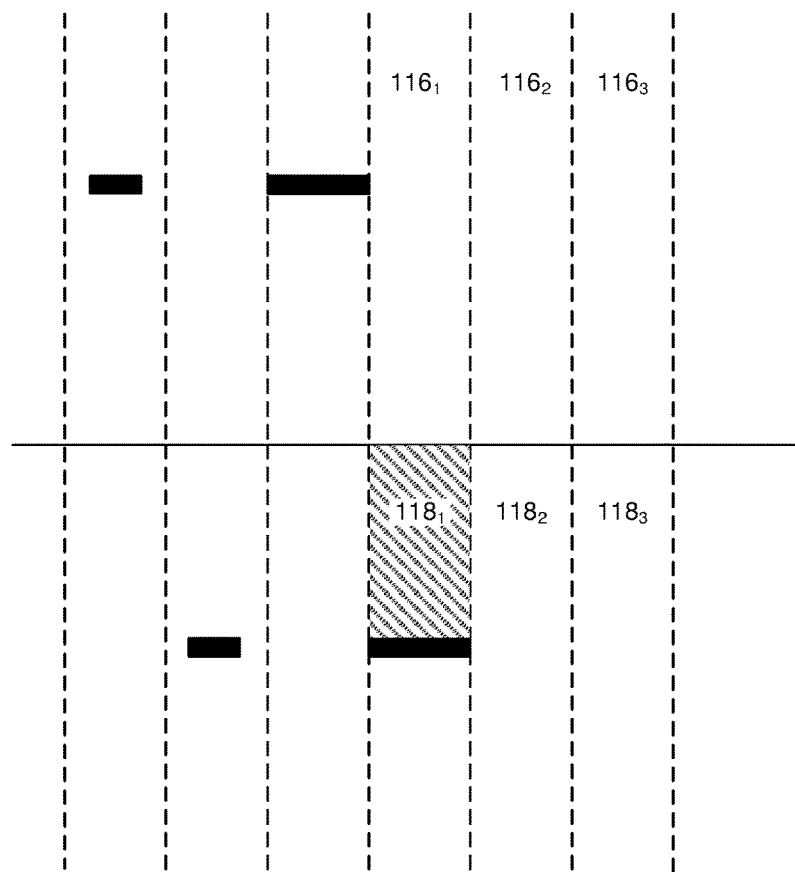
FIGS. 16A and 16B show an embodiment wherein data is written to a bottom disk surface during a single access interval, and then data is concurrently written to the bottom disk surface and a top disk surface during a dual access interval.
Figure 16B:
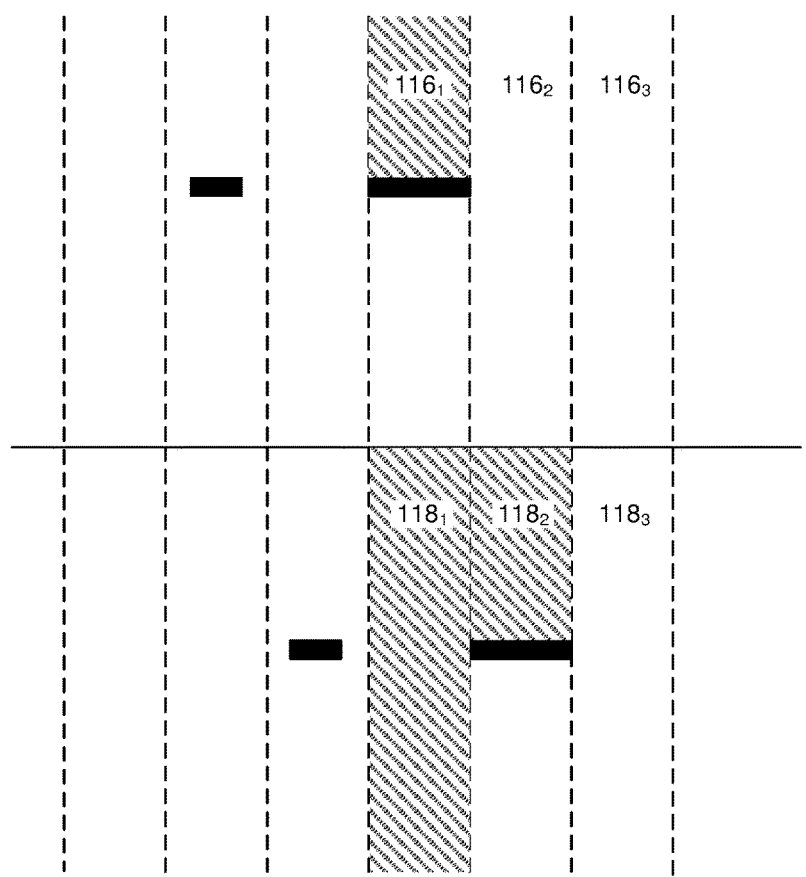

FIG. 16A shows an example of the flow diagram of FIG. 15 wherein a write operation is executed to top data tracks $116_1$-$116_3$ and to bottom data tracks $118_1$-$118_3$. In this embodiment, the radial offset between the read element of the top head and the read element of the bottom head exceeds the stroke capability of the fine actuators, thereby preventing the servoing of both heads while concurrently writing data to the top data track $116_1$ and the corresponding bottom data track $118_1$. Accordingly during a first phase of the write operation, data is first written to the bottom data track $118_1$ without writing data to the top data track $116_1$ during a single access interval as shown in FIG. 16A. After writing the bottom data track $118_1$ and seeking both heads by a single data track, the offset of the read elements enables the concurrent write of the top data track $116_1$ and bottom data track $118_2$ during a dual access interval as shown in FIG. 16B. After writing top data track $116_1$ and bottom data track $118_2$ and then seeking the heads by one data track, top data track $116_2$ and bottom data track $118_3$ are concurrently written. After writing the top data track $116_2$ and bottom data track $118_3$ and then seeking the heads by one data track, the top data track $116_3$ is written during another single access interval in order to complete the write operation. In some embodiments, more than one data track may be written during the first phase of the write operation to facilitate a radial offset between the read elements of the top and bottom heads that is more than one data track.

In one embodiment, the data received from the host during a write operation may be buffered in a volatile (e.g., DRAM or SRAM) or non-volatile memory (e.g., Flash memory) in order to facilitate the staggered writing of the data tracks. That is, the write data may be buffered so that the logical block addresses (LBAs) are mapped in a consecutive, interleaved sequence to the top and bottom consecutive data tracks. Referring to the example of FIGS. 16A and 16B, the write data for top data track $116_1$ may be buffered during the first phase of the write operation while writing to the bottom data track $118_1$. The write data for each of the following data tracks of the top disk surface are then buffered in a FIFO order while finishing the write operation, until the buffer is eventually flushed while writing the last top data track $116_3$. In another embodiment, the LBAs of the write data may be mapped first to the disk surface that is written during the single access mode (bottom disk surface in FIG. 16A), and then the LBAs mapped to both the data tracks of the top and bottom disk surfaces in an interleaved manner, and then the remaining LBAs mapped to the last data tracks written on the second disk surface (e.g., data track $116_3$ in FIG. 16B). In this embodiment, it is not necessary to buffer the write data to account for the staggered writing.

Figure 17A:
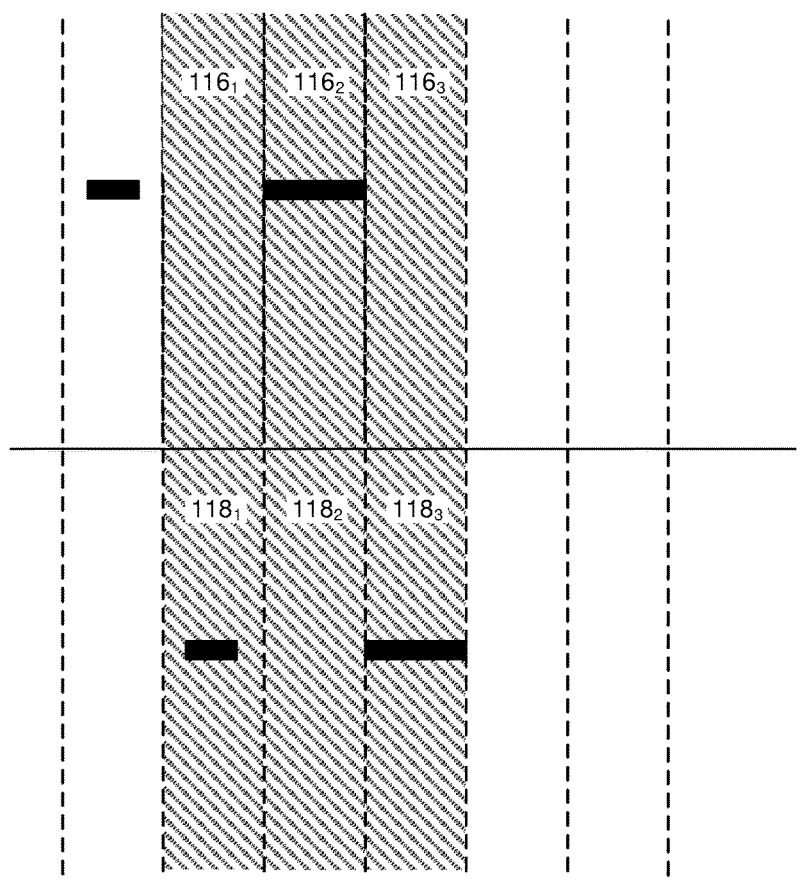
FIGS. 17A and 17B show an embodiment wherein data is read from a bottom disk surface during a single access interval, and then data is concurrently read from the bottom disk surface and a top disk surface during a dual access interval.
Figure 17B:
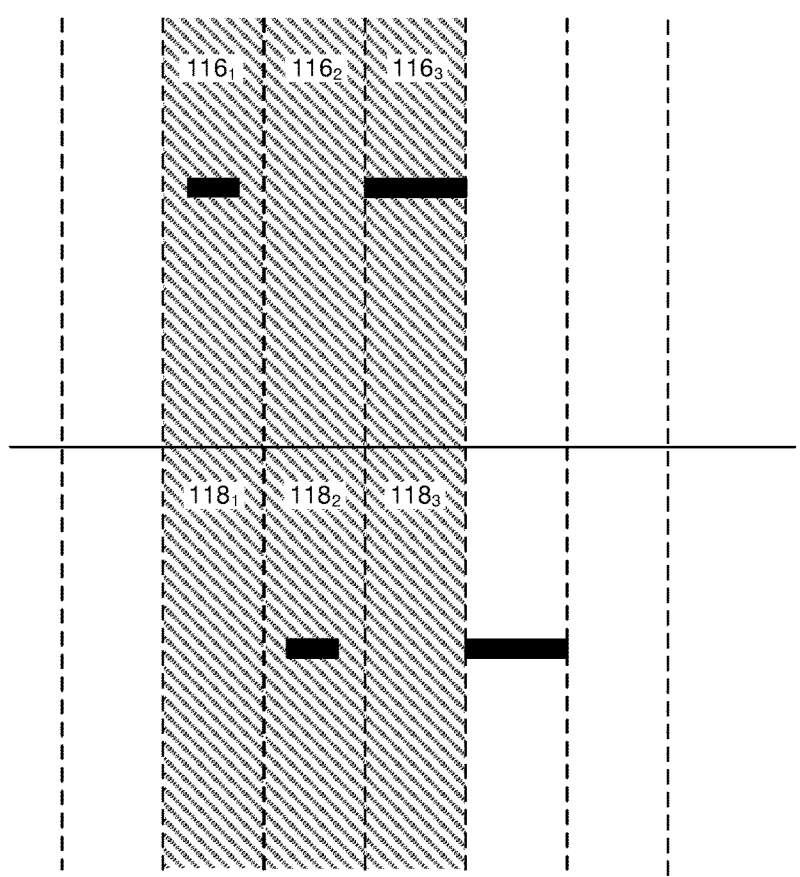

FIG. 17A shows an example of the flow diagram of FIG. 15 wherein a read operation is executed from top data tracks $116_1$-$116_3$ and from bottom data tracks $118_1$-$118_3$. In this embodiment, the radial offset between the read element of the top head and the read element of the bottom head exceeds the stroke capability of the fine actuators, thereby preventing the servoing of both heads while concurrently reading data from the top data track $116_1$ and the corresponding bottom data track $118_1$. Accordingly during a first phase of the read operation, data is first read from the bottom data track $118_1$ without reading data from the top data track $116_1$ during a single access interval as shown in FIG. 17A. After reading the bottom data track $118_1$ and seeking both heads by a single data track, the offset of the read elements enables the concurrent read of the top data track $116_1$ and bottom data track $118_2$ during a dual access interval as shown in FIG. 17B. After reading top data track $116_1$ and bottom data track $118_2$ and then seeking the heads by one data track, top data track $116_2$ and bottom data track $118_3$ are concurrently read. After reading the top data track $116_2$ and bottom data track $118_3$ and then seeking the heads by one data track, the top data track $116_3$ is read during another single access interval in order to complete the read operation. In some embodiments, more than one data track may be read during the first phase of the write operation to facilitate a radial offset between the read elements of the top and bottom heads that is more than one data track.

In one embodiment, the data read from the first disk surface during the first phase of a read operation may be buffered in a volatile (e.g., DRAM or SRAM) or non-volatile memory (e.g., Flash memory) in order to facilitate the staggered reading of the data tracks. That is, in one embodiment the logical block addresses (LBAs) are mapped in a consecutive, interleaved sequence to the top and bottom consecutive data tracks. Referring to the example of FIGS. 17A and 17B, the data read from bottom data track $118_1$ may be buffered during the first phase of the read operation. The read data for each of the following data tracks of the bottom disk surface are then buffered in a FIFO order while finishing the read operation, until the buffer is eventually flushed while reading the last top data track $116_3$. In this embodiment, buffering the staggered read data enables the data to be transferred to the host in an in-order sequence. In another embodiment, the data read from the top and bottom disk surface may be transferred to the host in an out-of-order sequence due to the staggered read operation. This embodiment avoids needing to buffer the read data during the first phase of the read operation since the LBAs may be transferred to the host out-of-order.

In another embodiment described above, the LBAs of the write data may be mapped first to the disk surface that is written during the single access mode (bottom disk surface in FIG. 16A), and then the LBAs mapped to both the data tracks of the top and bottom disk surfaces in an interleaved manner, and then the remaining LBAs mapped to the last data tracks written on the second disk surface (e.g., data track $116_3$ in FIG. 16B). In this embodiment, it is not necessary to buffer the read data to account for the staggered reading while still enabling the data to be transferred to the host in an in-order sequence.

In the embodiments described above, the radial density of the data tracks may be the same as the radial density of the servo tracks, wherein the data tracks may be radially aligned or radially offset from the servo tracks. In other embodiments, the radial density of the data tracks may be different than the radial density of the servo tracks, and in yet other embodiments, the radial density of the data tracks may vary across each disk surface. In one embodiment the radial density of concurrently accessed disk surfaces (e.g., top and bottom disk surfaces) is substantially the same across the disk surfaces. That is, any variation in the radial density of data tracks on a first disk surface may be matched by the same variation in radial density of data tracks on a second disk surface (e.g., top and bottom disk surfaces).

In one embodiment, the data tracks may be written using shingled magnetic recording (SMR) wherein the data tracks are written consecutively in an overlapping manner. Referring again to FIG. 2C, in one embodiment the SMR data tracks may be written from the outer diameter (OD) of a disk surface toward the middle diameter (MD), and from the inner diameter (ID) of the disk surface toward the MD. Accordingly in this embodiment, the order of the staggered write/read operations to first and second disk surface depends on the direction of writing (i.e., depends on which read element is the leading read element). That is, when writing from the OD toward MD the read element of the first head may be the leading read element, whereas when writing from the ID toward the MD the read element of the second head may be the leading read element.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI)

circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a first disk surface;
    a first head;
    a second disk surface;
    a second head;
    a coarse actuator configured to actuate the first head over the first disk surface and the second head over the second disk surface;
    a first fine actuator configured to actuate the first head over the first disk surface;
    a second fine actuator configured to actuate the second head over the second disk surface; and
    control circuitry configured to:
        calibrate a first bias signal for the first fine actuator;
        calibrate a second bias signal for the second fine actuator; and
        control the first fine actuator based on the first bias signal and control the second fine actuator based on the second bias signal in order to concurrently access the first disk surface and the second disk surface.

2. The data storage device as recited in claim 1, wherein the control circuitry is further configured to:
    generate a first compensation signal for the first fine actuator based on a measured position of the first head over the first disk surface;
    generate a second compensation signal for the second fine actuator based on a measured position of the second head over the second disk surface;
    generate a first control signal based on the first compensation signal and the first bias signal;
    generate a second control signal based on the second compensation signal and the second bias signal; and
    control the first fine actuator based on the first control signal and control the second fine actuator based on the second control signal in order to concurrently access the first disk surface and the second disk surface.

3. The data storage device as recited in claim 1, wherein the control circuitry is further configured to:
    measure a radial offset of the first head and the second head; and
    calibrate the first bias signal and the second bias signal based on the measured radial offset.

4. The data storage device as recited in claim 1, wherein:
    the first bias signal causes a first displacement of the first fine actuator relative to a neutral position of the coarse actuator during the concurrent access; and
    the second bias signal causes a second displacement of the second fine actuator relative to the neutral position of the coarse actuator during the concurrent access.

5. The data storage device as recited in claim 4, wherein the first displacement is substantially equal to the second displacement.

6. The data storage device as recited in claim 4, wherein the control circuitry is further configured to:
    measure a first stroke of the first fine actuator and measure a second stroke of the second fine actuator; and
    calibrate the first bias signal and the second bias signal based on the measured strokes.

7. The data storage device as recited in claim 6, wherein when the first stroke is greater than the second stroke, the first bias signal is configured to be greater than the second bias signal.

8. The data storage device as recited in claim 1, wherein the control circuitry is further configured to:
    measure a first stroke of the first fine actuator and measure a second stroke of the second fine actuator; and
    calibrate the first bias signal and the second bias signal based on the measured strokes.

9. The data storage device as recited in claim 1, wherein the control circuitry is further configured to:
    calibrate the first bias signal and the second bias signal for a plurality of different temperatures;
    measure a temperature associated with the concurrent access; and execute the concurrent access using a temperature compensated first and second bias signal.

10. The data storage device as recited in claim 9, wherein the temperature compensated first and second bias signal compensate for a temperature dependent variation of a radial offset of the first and second head.

11. The data storage device as recited in claim 9, wherein the temperature compensated first and second bias signal compensate for a temperature dependent variation of a stroke of the first and second fine actuator.

12. A data storage device comprising:
a first disk surface;
a first head;
a second disk surface;
a second head;
a coarse actuator configured to actuate the first head over the first disk surface and the second head over the second disk surface;
a first fine actuator configured to actuate the first head over the first disk surface;
a second fine actuator configured to actuate the second head over the second disk surface; and
control circuitry configured to execute a concurrent access operation of the first disk surface and the second disk surface by at least:
 generating a first compensation signal for the first fine actuator based on a measured position of the first head over the first disk surface;
 generating a second compensation signal for the second fine actuator based on a measured position of the second head over the second disk surface;
 generating a first control signal based on the first compensation signal and a first bias signal;
 generating a second control signal based on the second compensation signal and a second bias signal; and
 control the first fine actuator based on the first control signal and control the second fine actuator based on the second control signal in order to concurrently access the first disk surface and the second disk surface.

13. The data storage device as recited in claim 12, wherein the control circuitry is further configured to:
measure a radial offset of the first head and the second head; and
calibrate the first bias signal and the second bias signal based on the measured radial offset.

14. The data storage device as recited in claim 12, wherein:
the first bias signal causes a first displacement of the first fine actuator relative to a neutral position of the coarse actuator during the concurrent access; and
the second bias signal causes a second displacement of the second fine actuator relative to the neutral position of the coarse actuator during the concurrent access.

15. The data storage device as recited in claim 14, wherein the first displacement is substantially equal to the second displacement.

16. The data storage device as recited in claim 14, wherein the control circuitry is further configured to:
measure a first stroke of the first fine actuator and measure a second stroke of the second fine actuator; and
calibrate the first bias signal and the second bias signal based on the measured strokes.

17. The data storage device as recited in claim 16, wherein when the first stroke is greater than the second stroke, the first bias signal is configured to be greater than the second bias signal.

18. The data storage device as recited in claim 12, wherein the control circuitry is further configured to:
measure a first stroke of the first fine actuator and measure a second stroke of the second fine actuator; and
calibrate the first bias signal and the second bias signal based on the measured strokes.

19. The data storage device as recited in claim 12, wherein the control circuitry is further configured to:
calibrate the first bias signal and the second bias signal for a plurality of different temperatures;
measure a temperature associated with the concurrent access; and
execute the concurrent access using a temperature compensated first and second bias signal.

20. A data storage device comprising:
a first disk surface;
a first head;
a second disk surface;
a second head;
a coarse actuator configured to actuate the first head over the first disk surface and the second head over the second disk surface;
a first fine actuator configured to actuate the first head over the first disk surface;
a second fine actuator configured to actuate the second head over the second disk surface;
a means for calibrating a first bias signal for the first fine actuator;
a means for calibrating a second bias signal for the second fine actuator; and
a means for controlling the first fine actuator based on the first bias signal and control the second fine actuator based on the second bias signal in order to concurrently access the first disk surface and the second disk surface.

* * * * *